April 9, 1929. R. E. STINSON 1,708,433
FENDER CLAMP OR GRIP HOOK
Filed April 26, 1928
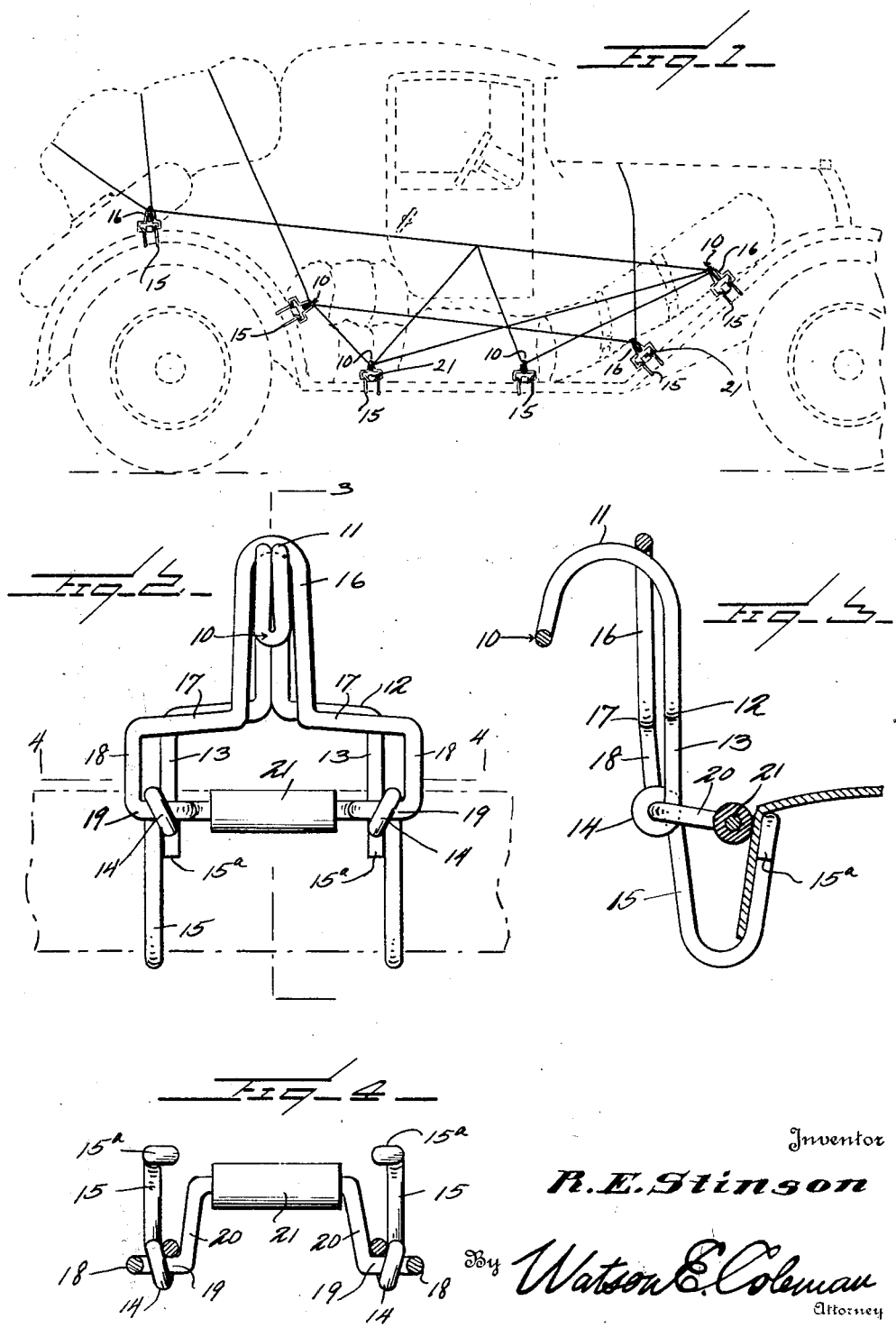

Patented Apr. 9, 1929.

1,708,433

UNITED STATES PATENT OFFICE.

ROBERT E. STINSON, OF KLAMATH FALLS, OREGON.

FENDER CLAMP OR GRIP HOOK.

Application filed April 26, 1928. Serial No. 273,088.

This invention relates to devices whereby luggage may be carried on the fenders or running boards of automobiles, and particularly to a grip hook having means whereby it may be gripped to the running board or fenders of a car and carrying a hook whereby a rope or other flexible connection may be engaged, this rope or flexible connection passing over the luggage and holding the luggage securely upon the running board or packed upon the fender.

A further object is to provide a device of this character comprising a hook element having means for engaging with a running board, and a clamping lever angular in form and pivotally mounted upon the hook element and shiftable in one direction to clamp against the running board and lock the device in place thereon.

A still further object is to provide a device of this character which is simply made, which may be cheaply constructed and sold for a small price, and which is particularly effective for the purpose stated.

My invention is illustrated in the accompanying drawing, wherein:—

Figure 1 is a side elevation of an automobile in dotted lines, showing my hook device applied thereto and the manner in which the luggage holding cords are connected to the hook devices;

Figure 2 is a face view of my grip hook;

Figure 3 is a section on the line 3—3 of Figure 2;

Figure 4 is a section on the line 4—4 of Figure 2;

Referring to this drawing, it will be seen that the device comprises a hook element or body portion and a clamping element. The hook element consists of a single piece of wire bent upon itself at 10 to form two parallel hook portions 11, these two hook portions constituting the bill of the hook. At the base of the hook portions 11 the two legs of the wire are angularly bent in divergent relation, as at 12, the wire then extends rearward, as at 13, and each leg is bent to form the eye 14. Beyond the eye the legs are extended rearward and then curved to form small fender-engaging hooks 15, the bills of which are extended in a reverse direction to the bill of the hook 11.

Cooperating with this hook element or body portion is a clamping lever also formed of a single piece of wire bent upon itself to form a bight 16, then angularly bent outward at 17, rearward at 18 and inward at 19 to form pivots passing through the eyes 14, and then angularly bent at 20 to form radial arms and again angularly bent to extend through a roller 21 of rubber or like material. The bight portion 16 of the clamping element is sufficiently wide to admit within it the hook 11 of the hook element and is sufficiently long to snap past this hook element either in opening or closing.

In the use of this device, the hooks 15 whose extremities are bent, as at 15ª, so as to provide relatively wide, fender-engaging surfaces, are slipped beneath the fenders or the outer flange of the running board or engaged with any other relatively thin sheet metal part. This is done with the lever raised or forced outward so that the roller is lifted away from the hooks 15, then the lever is depressed, that is, its bight or loop portion 16 is forced over the hook 11, which urges the roller downward and rearward or toward the hooks 15 until the loop or bight has passed the bill 11. The pressure on the roller is now upward or outward so that the clamp cannot become released unless the loop is positively pulled outward and the roller passes the pivotal center of the arms 20. As soon as this has been accomplished, the clamp may be readily detached.

The clamps are to be put in place in any convenient position upon the running board, fender or any other part of the car that will permit the action of the clamps, and then ropes may be engaged with the hooks 11 of the various clamps to hold the luggage in place upon the running board and fender in the manner illustrated in Figure 1. With this device it is an easy matter to engage the hooks at any portion of the running board and thus attach the ropes at any desired points for the purpose of binding the luggage in place.

It will be understood, of course, that this device may be modified so as to fit on various makes of running board. Thus, for instance, some of the running boards are flat and relatively thick and are not formed with a downwardly extending marginal flange behind which the foot 15ª will engage but the clamp must be so formed that the portions 15 and 15ª will be disposed horizontally so as to engage a flat running board. It is to be understood that this is within the purview of my invention to so form these clamps that they may engage with any of the ordinary running boards or with various types of fenders.

I claim:—

1. A grip hook of the character described comprising a hook element having a main rope-engaging hook and a connected integral hook adapted to engage with the fender or other sheet metal part of a car, and a clamping lever pivoted to the hook element for movements independent thereof and coacting with the fender-engaging hook to hold the latter in place.

2. A grip hook of the character described comprising a hook element formed at one end with a main rope hook and at the opposite end with hooks adapted to engage over a sheet metal flange, and a lever pivoted upon the hook element and having a cranked portion formed with a yielding roller and coacting with the fender-engaging hooks, the lever element having an elongated loop constituting a handle and adapted to pass over the main hook on the hook element.

3. A grip hook of the character described comprising a hook element formed at one end with a main hook and at its opposite ends with oppositely extending hooks adapted to embrace a sheet metal flange of a motor car and being formed intermediate the first named hook and the last named hooks with eyes, and a clamping lever formed to provide a loop to pass over the main hook and to provide a cranked portion, the arms of which are pivotally mounted within said eyes, the cranked portion being disposed adjacent the second named hooks and carrying a yielding roller, the cranked portion being forced beyond its pivotal center when the loop is forced down over the main hook.

4. A grip hook of the character described comprising a hook element formed of a single piece of wire bent at its middle and formed to provide a hook, the legs of the element then extending laterally outward, then being bent to form eyes and extending rearward and in a direction reverse to the first named hook, and a lever element also formed of a single piece of wire bent to form a medial loop and then laterally extended in opposite directions, then rearwardly extended, and inwardly extented to pass through the eyes, then extended to form arms and supporting a roller of resilient material.

5. A grip hook of the character described, comprising a body element having a main rope engaging hook at one end and a hook portion at the other end adapted to engage with the fender or other sheet metal part of a car and a clamping lever pivoted to the body portion and carrying a clamping roller adapted to coact with the fender engaging hook to clamp a portion of the fender or other part of the car between the roller and said fender engaging hook.

6. A grip hook of the character described, comprising a body portion formed to provide reversely curved hooks at its ends, one of said hooks being adapted to engage with the fender or other sheet metal part of a car and a clamping lever pivoted upon the body portion and a clamping roller adapted to coact with the fender engaging hook and when in one position to clamp the fender between the roller and the fender engaging hook.

7. A grip hook of the character described, comprising a body portion having a main rope engaging hook and a reversely curved hook adapted to engage with a fender or other sheet metal part of a car, a clamping member mounted upon the body portion and adapted to have wedging engagement against the fender engaged by the last named hook.

8. A grip hook of the character described, comprising a body portion having a main rope engaging hook and reversely curved integral hooks adapted to engage with a fender or other sheet metal part of a car, and a clamping lever pivoted upon the body portion and having a clamping portion adapted when in one position to confront the fender engaging hook and clamp the fender between the hooks and clamping portion of the lever.

9. A gripping device of the character described, comprising a body element having a clamping hook adapted to be engaged with a fender or other sheet metal part of a car, a lever mounted on the body element and having a clamping portion movable in a direction nearly parallel to the bill of the clamping hook, the device having a rope engaging hook.

In testimony whereof I hereunto affix my signature.

ROBERT E. STINSON.